(12) United States Patent
Ganchev et al.

(10) Patent No.: US 11,849,041 B2
(45) Date of Patent: Dec. 19, 2023

(54) SECURE EXCHANGE OF SESSION TOKENS FOR CLAIMS-BASED TOKENS IN AN EXTENSIBLE SYSTEM

(71) Applicant: VMware, Inc., Palo Alto, CA (US)

(72) Inventors: Tony Ganchev, Sofia (BG); Plamen Dimitrov, Polski Izvor (BG)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 17/220,459

(22) Filed: Apr. 1, 2021

(65) Prior Publication Data

US 2022/0321345 A1 Oct. 6, 2022

(51) Int. Cl.
*H04L 9/32* (2006.01)
(52) U.S. Cl.
CPC .................................. *H04L 9/3213* (2013.01)
(58) Field of Classification Search
CPC ....... H04L 9/3213; H04L 9/3242; H04L 9/30; H04L 9/3247; H04L 63/0853; H04L 63/10; H04L 9/32; H04L 9/00; H04L 63/083
See application file for complete search history.

(56) References Cited

U.S. PATENT DOCUMENTS

| | | | | |
|---|---|---|---|---|
| 6,993,596 B2* | 1/2006 | Hinton | ................ | H04L 63/0815 |
| | | | | 709/204 |
| 10,880,292 B2* | 12/2020 | Koottayi | ................ | H04L 67/141 |
| 11,469,903 B2* | 10/2022 | Shankar | ................ | H04L 9/0894 |
| 2014/0297759 A1* | 10/2014 | Mody | ..................... | H04L 51/08 |
| | | | | 709/206 |
| 2015/0149766 A1* | 5/2015 | Shukla | ................ | H04L 63/0815 |
| | | | | 713/155 |
| 2018/0278603 A1* | 9/2018 | Yabe | .................... | H04L 63/0892 |
| 2019/0068585 A1* | 2/2019 | Zeng | ...................... | G06F 21/34 |
| 2020/0259652 A1* | 8/2020 | Schmaltz, III | ............ | H04L 9/30 |

* cited by examiner

*Primary Examiner* — Abu S Sholeman
(74) *Attorney, Agent, or Firm* — Kim & Stewart LLP (57) ABSTRACT

A method of securely exchanging a session token for a claims-based token by a plug-in integrated into an extensible system includes the steps of: transmitting, to an extensible system server of the extensible system, the session token and a request for a first claims-based token that corresponds to the session token and that is cryptographically signed by an authentication server; acquiring, from the extensible system server, the first claims-based token; transmitting, to the authentication server, the first claims-based token and a request for a second claims-based token; and receiving, from the authentication server, the second claims-based token, wherein the second claims-based token is cryptographically signed by the authentication server, and wherein if the second claims-based token is transmitted to a resource provider server hosting a resource provider service, the resource provider service performs a requested operation on behalf of an interactive user of the extensible system.

17 Claims, 6 Drawing Sheets

SECURE EXCHANGE OF SESSION TOKENS FOR CLAIMS-BASED TOKENS IN AN EXTENSIBLE SYSTEM

BACKGROUND

A resource provider service, such as a blog, performs operations for authorized agents. To determine whether an agent is authorized, a resource provider service may accept a session token, which is typically a random number that is issued to an agent so that the agent may present the session token later for authentication. However, such a session token contains no security information such as the identity of the agent, the agent's permissions, or a signature of the issuer of the session token. As such, only the issuer of the session token can make an authorization decision based on the session token. Additionally, an attacker that steals the session token may use the session token to be authenticated as the authorized agent.

Due to security risks involved with session tokens, many resource provider services only accept claims-based tokens, which are signed by a trusted authority and which may provide a proof-of-possession guarantee that the claims-based token is possessed by its rightful holder. For example, an authentication server that issues a claims-based token may sign the claims-based token with the authentication server's private encryption key. As such, if a resource provider service receives the claims-based token from a client device, as long as the resource provider service has a copy of the authentication server's public encryption key, the resource provider service can determine if a request from the client device is authorized by the authentication server. The possessor of the claims-based token may further sign an application programming interface (API) call transmitted to the resource provider service to prove the possessor's identity.

An extensible system is software the functionality of which may be enhanced without updating the extensible system itself. The functionality of an extensible system may instead be enhanced by installing plug-ins. However, while the extensible system itself may employ session tokens, plug-ins may be installed that make use of resource provider services that only accept claims-based tokens. In such a system, there is a need for session tokens to be exchanged for claims-based tokens in a secure manner that does not allow for an attacker with a session token to acquire a claims-based token.

Existing systems include servers that exchange different types of tokens by utilizing, e.g., security assertion markup language (SAML). However, such systems do not allow for exchanging pre-existing session tokens for claims-based tokens. Additionally, some systems make use of a proxy component, e.g., an API gateway, to exchange session tokens for claims-based tokens. In such systems, API calls cannot be made directly to resource provider services. Instead, each API call must include a session token and be made to the API gateway. The API gateway must then exchange the session token for a claims-based token and retransmit the API call with the claims-based token to a resource provider service. Because every API call passes through the gateway, such systems introduce latency, which reduces performance. There is a need for a more efficient integration of plug-ins using claims-based tokens into extensible systems that utilize session tokens.

SUMMARY

Accordingly, one or more embodiments provide a method of securely exchanging a session token for a claims-based token by a plug-in integrated into an extensible system. The method includes the steps of: transmitting, to an extensible system server of the extensible system, the session token and a request for a first claims-based token that corresponds to the session token and that is cryptographically signed by an authentication server; acquiring, from the extensible system server, the first claims-based token; transmitting, to the authentication server, the first claims-based token and a request for a second claims-based token; and receiving, from the authentication server, the second claims-based token, wherein the second claims-based token is cryptographically signed by the authentication server, and wherein if the second claims-based token is transmitted to a resource provider server hosting a resource provider service, the resource provider service performs a requested operation on behalf of an interactive user of the extensible system.

Further embodiments include a non-transitory computer-readable storage medium comprising instructions that cause a computer system to carry out the above method, as well as a computer system configured to carry out the above method.

DETAILED DESCRIPTION

Figure 1:
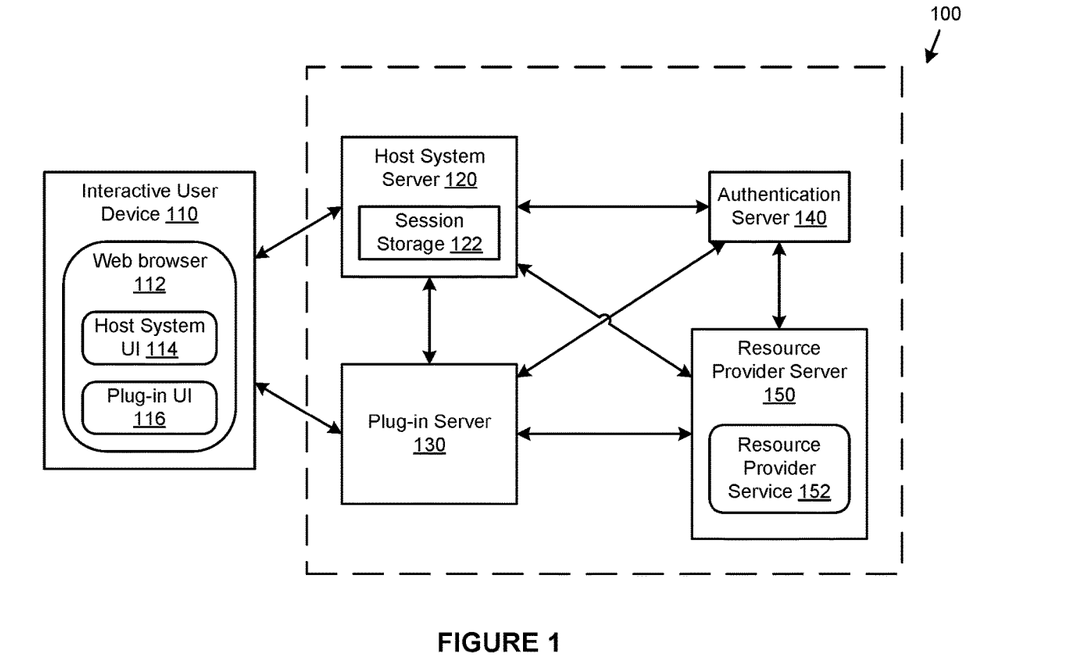
FIG. 1 is a block diagram of a computing system in which a plug-in server integrated into a host system that is an extensible system may securely exchange a session token for a claims-based token, according to embodiments.

FIG. 1 is a block diagram of a computing system 100 in which a plug-in server 130 integrated into a host system that is an extensible system may securely exchange a session token for a claims-based token, according to embodiments. Computer system 100 includes a host system server 120, plug-in server 130, an authentication server 140, and a resource provider server 150. Host system server 120, plug-in server 130, authentication server 140, and resource provider server 150 are constructed on server grade hardware platforms such as x86 architecture platforms.

The host system is an extensible system such as, e.g., vSphere Client, provided by VMware Inc., and host system server 120 is a server component of the host system. Plug-in server 130 is a server component of a plug-in, which integrates into the host system. The plug-in may be, e.g., Veeam Backup and Restore for vSphere. Computer system 100 may also include additional plug-in servers (not shown) for a variety of plug-ins.

An interactive user device 110 communicates with host system server 120 and plug-in server 130 to request operations to be performed. Interactive user device 110 is a device, such as a smart phone, laptop computer, desktop computer, etc., of an interactive user such as an employee of a company. Interactive user device 110 includes a host system user interface (UI) 114 for interacting with host system server 120 and a plug-in UI 116 for interacting with plug-in server 130. In FIG. 1, host system UI 114 and plug-in UI 116 are included in a web browser 112. However, in other embodiments, host system UI 114 and plug-in UI 116 may be included in separate web browsers or may not be included in web browsers at all.

When the interactive user interacts with host system server 120 by providing credentials such as a username and password through host system UI 114, host system server 120 creates a session and stores a session token and corresponding claims-based token as an unordered set in a session storage 122 of host system server 120. Session storage 122 is an expiring storage area of host system server 120 such as a cache. Host system server 120 also transmits a copy of the session token to interactive user device 110, which host system UI 114 may use to communicate with host system server 120.

Resource provider server 150 includes a resource provider service 152, which performs operations requested by the interactive user and that authenticates such requests using claims-based tokens. Resource provider service 152 is integrated with authentication server 140, which provides such claims-based tokens in computer system 100. Authentication server 140 may provide such tokens through, e.g., vSphere Security Token Service (STS). Computer system 100 may also include additional resource provider servers (not shown) for hosting a variety of resource provider services.

Each of host system server 120 and plug-in server 130 includes a service user that acts on behalf of the interactive user. The service users are not themselves physical users. The service users are internal accounts used by host system server 120 and plug-in server 130 to perform background operations for host system server 120 and plug-in server 130. Furthermore, claims-based tokens are delegated to the service users so that the service users can perform operations on behalf of the interactive user. For example, if authentication server 140 creates a claims-based token for the interactive user, delegated to the service user of host system server 120, the service user of host system server 120 can use the claims-based token to authenticate on behalf of the interactive user. Similarly, if the authentication server creates a claims-based token for the interactive user, delegated to the service user of plug-in server 130, then the service user of plug-in server 130 can use the claims-based token to authenticate on behalf of the interactive user.

Figure 2:
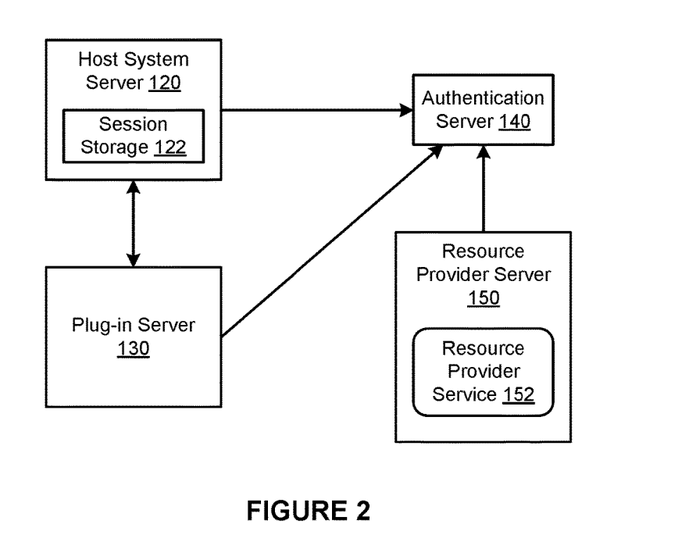
FIG. 2 is a block diagram illustrating the trust that different components of a computer system may establish to allow for a plug-in sever to securely exchange a session token for a claims-based token, according to embodiments.

FIG. 2 is a block diagram illustrating the trust that components of computer system 100 may establish to allow for plug-in server 130 to securely exchange a session token for a claims-based token, according to embodiments.

Each of host system server 120, plug-in server 130, and resource provider server 150 trust authentication server 140. For example, authentication server 140 may generate a private key to sign claims-based tokens and a public key to transmit to each of host system server 120, plug-in server 130, and resource provider server 150. Each of host system server 120, plug-in server 130, and resource provider service 152 may then determine whether to trust a received claims-based token by using its respective copy of authentication server 140's public key to determine if the received claims-based token was signed by authentication server 140's private key.

Host system server 120 and plug-in server 130 trust each other. For example, plug-in server 130 may generate a private key for signing requests for claims-based tokens and a public key that it provides to host system server 120. As such, when the interactive user of plug-in server 130 requests a claims-based token from host system server 120, the service user of host system server 120 may use plug-in server 130's public key to determine that the request was transmitted by a trusted entity. Host system server 120 may thus avoid providing an attacker with a claims-based token. For added security, in the case of SAML claims-based tokens, host system server 120 may, for example, generate a private key for signing claims-based tokens and a public key that it transmits to plug-in server 130.

Trust is established during the deployment of computer system 100 and on installation of the plug-in and re-established periodically for security purposes. For example, after a predetermined length of time has elapsed since sharing public keys, the components of computer system 100 can generate and share new public keys to thwart attackers that gained access to previously shared keys.

Figure 3:
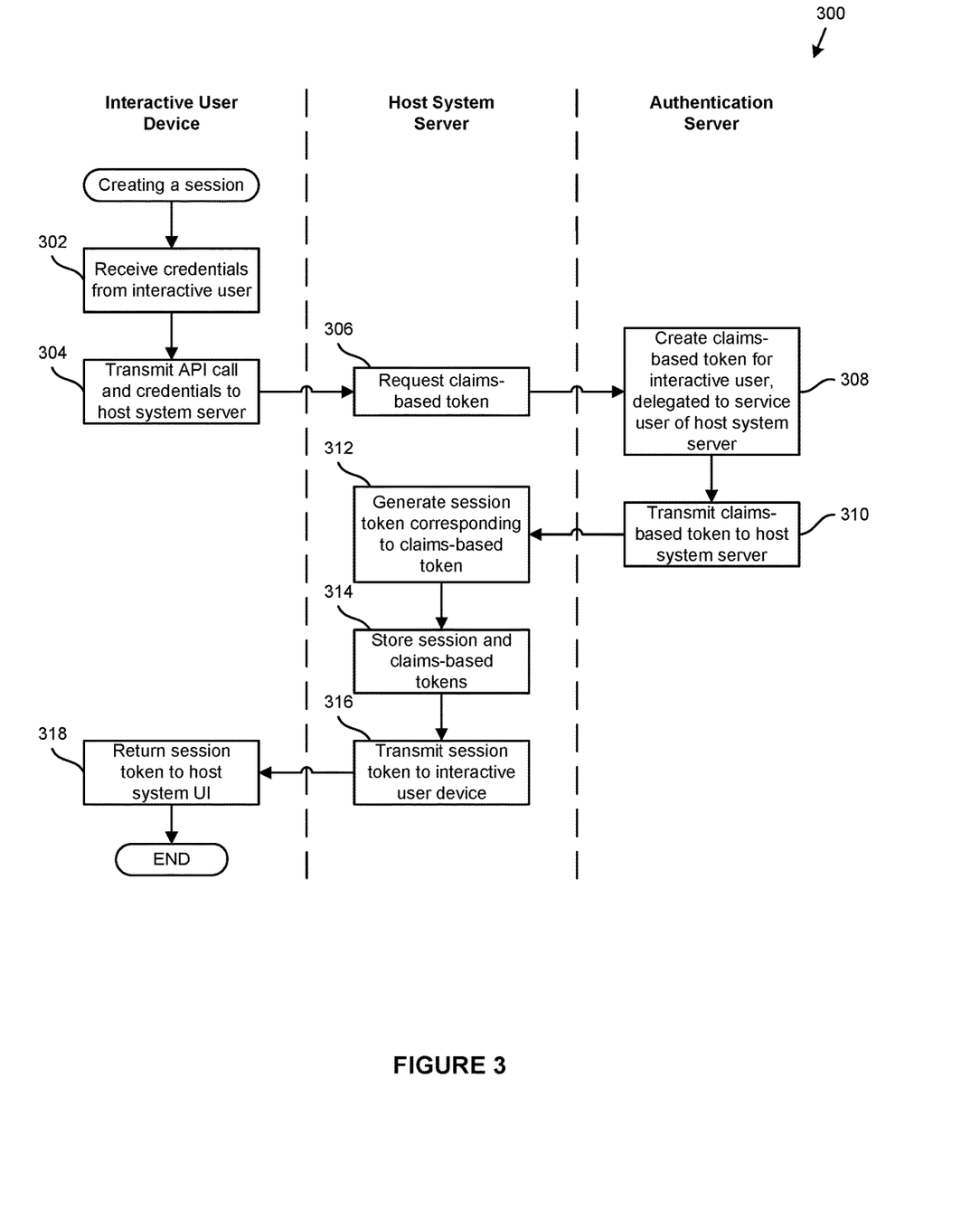
FIG. 3 is a flow diagram of steps carried out by an interactive user device, host system server, and authentication server to perform a method of creating a session, according to an embodiment.

FIG. 3 is a flow diagram of steps carried out by interactive user device 110, host system server 120, and authentication server 140 to perform a method 300 of creating a session, according to an embodiment. Creating a session is necessary for obtaining a session token, which may later be used to exchange for a claims-based token. Before method 300 is performed, authentication server 140 issues a bearer token to the interactive user and transmits the bearer token to host system server 120. The bearer token is not a claims-based token and provides no proof-of-possession guarantee.

At step 302, interactive user device 110 receives credentials such as a username and password from the interactive user. For example, the interactive user may enter the username and password through host system UI 114. At step 304, interactive user device 110 transmits an API call to host system server 120 including the credentials received from the interactive user.

At step 306, host system server 120 transmits a request to authentication server 140 for a claims-based token for the interactive user that is delegated to the service user of host system server 120. Along with the request, host system server 120 includes the interactive user's credentials and the bearer token that was previously issued to the interactive user.

At step 308, authentication server 140 validates the request and creates a claims-based token with authentication server 140's signature for the interactive user, which is delegated to the service user of host system server 120. At step 310, authentication server 140 transmits the claims-based token to host system server 120.

At step 312, host system server 120 generates a session token corresponding to the claims-based token. At step 314, host system server 120 stores the session token and the claims-based token together as an unordered set in session storage 122. At step 316, host system server 120 transmits a copy of the session token to interactive user device 110. At step 318, interactive user device 110 returns the session token to host system UI 314. After step 318, method 300 ends.

If the interactive user wishes to perform an operation in the session created by method 300, the interactive user may request the operation through host system UI 314. Host system UI 314 may then pass the session token to host system server 120. The service user of host system server 120 may then retrieve the corresponding claims-based token from session storage 122, and pass a signed API call including the claims-based token directly to resource provider service 152. Because the claims-based token was delegated to the service user of host system server 120, resource provider service 152 will perform the requested operation on behalf of the interactive user.

However, for the interactive user to use plug-in UI 116 to perform an operation in the created session, plug-in UI 116 must acquire the session token, as discussed below in conjunction with FIG. 4. Additionally, plug-in server 130 must acquire a claims-based token for the interactive user, delegated to the service user of plug-in server 130, as discussed below in conjunction with FIGS. 5 and 7.

Figure 4:
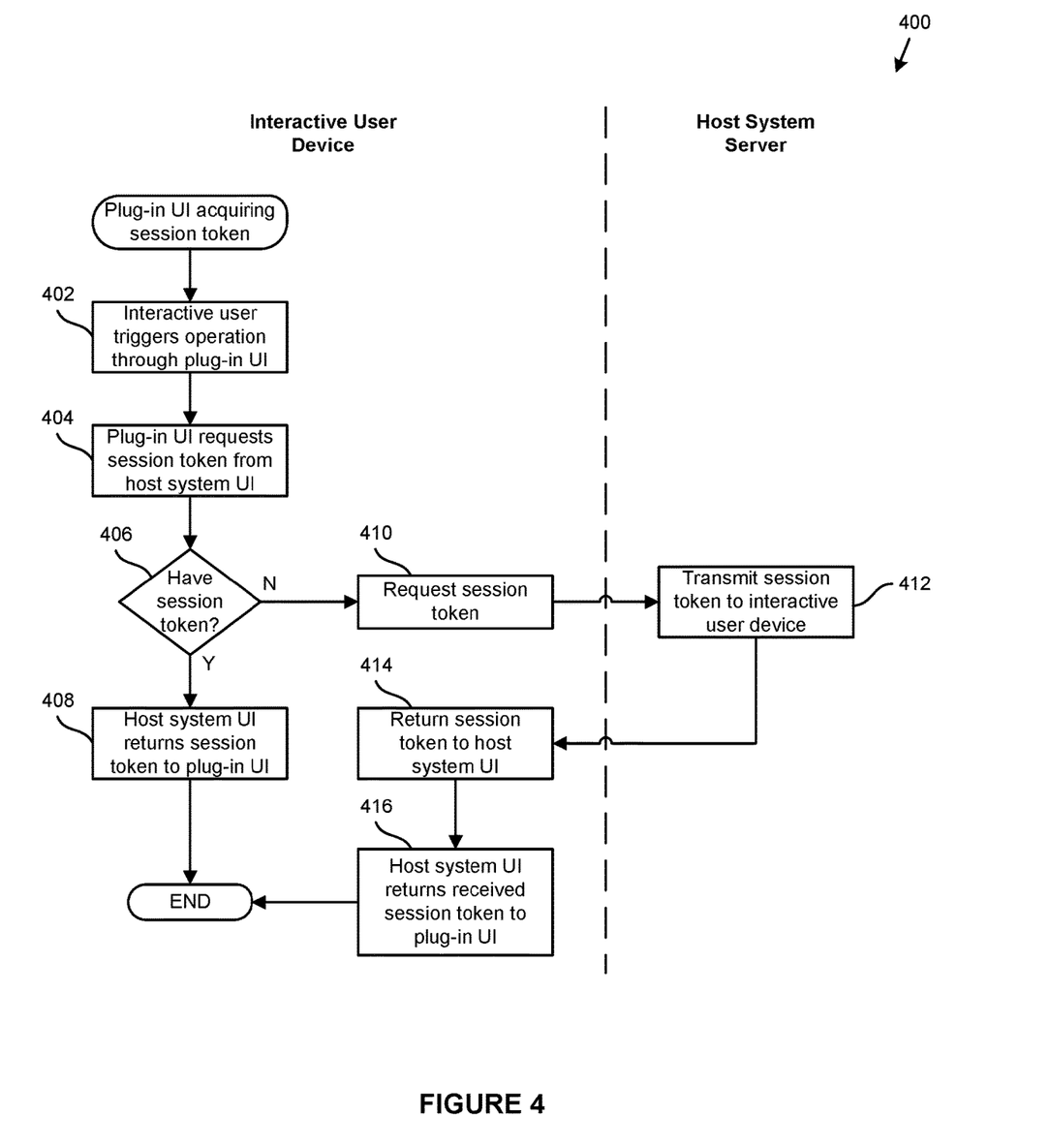
FIG. 4 is a flow diagram of steps carried out by an interactive user device and host system server to perform a method of providing a session token to a plug-in user interface, according to an embodiment.

FIG. 4 is a flow diagram of steps carried out by interactive user device 110 and host system server 120 to perform a method 400 of providing a session token to plug-in UI 116, according to an embodiment. In some implementations, host system UI 114 uses the same session tokens as plug-in UI 116. In other implementations, host system server 120 creates unique session tokens for plug-in UI 116.

At step 402, the interactive user triggers an operation through plug-in UI 116. At step 404, plug-in UI 116 requests a session token from host system UI 114. For example, in embodiments in which host system UI 114 and plug-in UI 116 are provided in the same web browser 112, the request may be a JavaScript API call.

At step 406, host system UI 114 determines whether it already has a session token to return to plug-in UI 116, i.e., if plug-in UI 116 uses the same session tokens as host system UI 114 and host system UI 114 has access to the session token for the interactive user. If host system UI 114 has a session token to return to plug-in UI 116, then at step 408, host system UI 114 returns the session token to plug-in UI 116. After step 408, method 400 ends, and plug-in UI 116 passes its session token to plug-in server 130.

Otherwise, if host system UI 114 does not have the necessary session token to return to plug-in UI 116 at step 406, then at step 410, interactive user device 110 transmits a request to host system server 120 for a session token for the interactive user for plug-in UI 116. At step 412, host system server 120 transmits such a session token to interactive user device 110. For example, the service user of host system server 120 may retrieve the session token from session storage 122 or host system server 120 may generate a new session token.

At step 414, interactive user device 110 returns the session token transmitted by host system server 120 at step 412 to host system UI 114. At step 416, host system UI 114 returns the received session token to plug-in UI 116. After step 416, method 400 ends, and plug-in UI 114 passes its session token to plug-in server 130.

Figure 5:
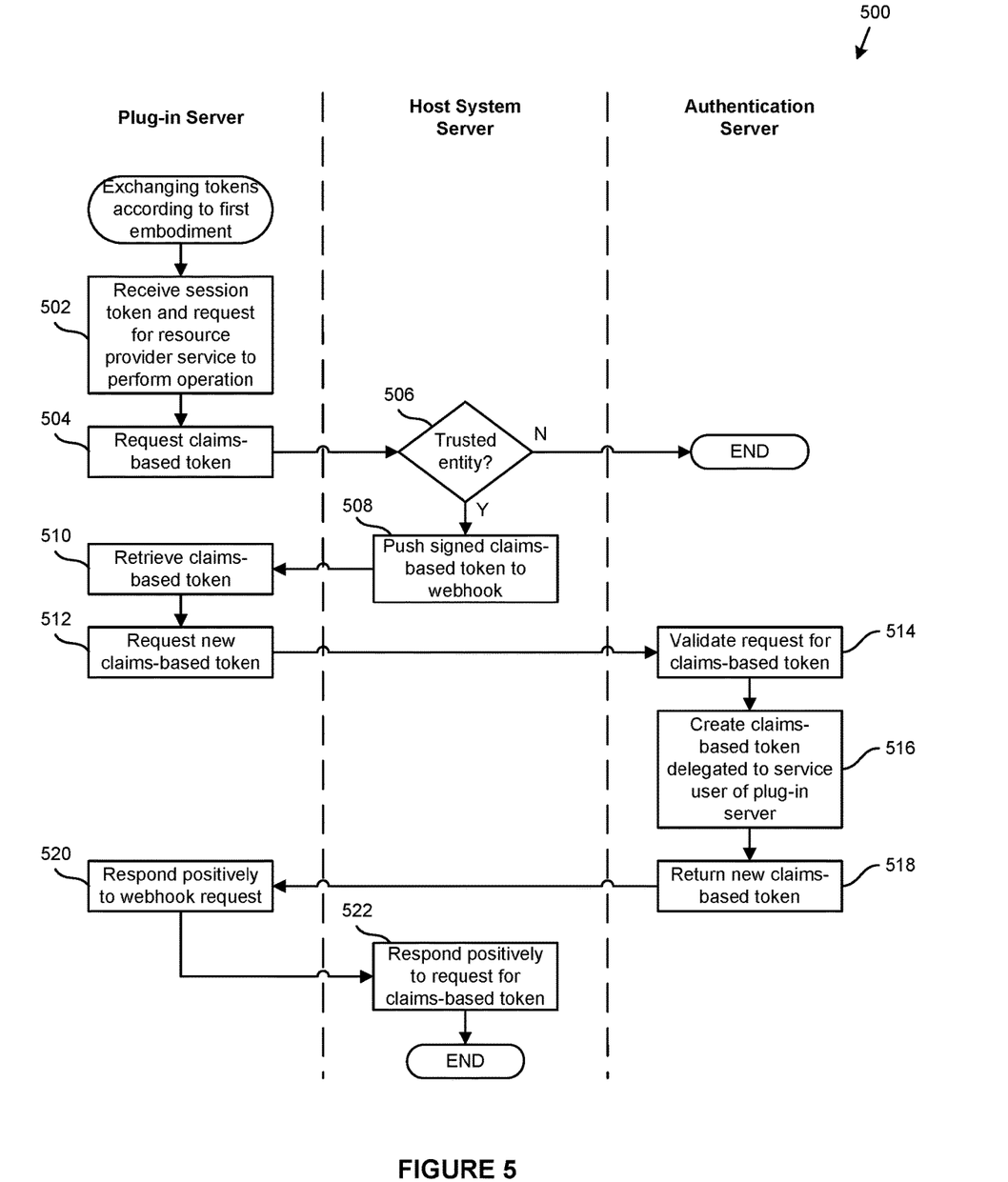
FIG. 5 is a flow diagram of steps carried out by a plug-in server, host system server, and authentication server to perform a method of securely exchanging a session token for a claims-based token, according to a first embodiment.

FIG. 5 is a flow diagram of steps carried out by plug-in server 130, host system server 120, and authentication server 140 to perform a method 500 of securely exchanging a session token for a claims-based token, according to a first embodiment. In the first embodiment, plug-in server 130 obtains a claims-based token for the interactive user, delegated to the service user of plug-in server 130, directly from authentication server 140.

At step 502, plug-in server 130 receives a session token from interactive user device 110 along with a request for resource provider service 152 to perform an operation. At step 504, plug-in server 130 transmits a request to host system server 120 for a claims-based token corresponding to the session token. Plug-in server 130 includes the session token along with the request, and the service user of plug-in server 130 signs the request.

At step 506, the service user of host system server 120 determines whether the request was transmitted by a trusted entity, e.g., by using a public key of plug-in server 130. This security check helps to thwart an attacker that gained possession of the session token from exchanging the compromised session token for a claims-based token. If the request was not transmitted by a trusted entity, method 500 ends.

If the request was transmitted by a trusted entity, then at step 508, as a request, the service user of host system server 120 signs the claims-based token from session storage 122 corresponding to the session token and transmits the signed claims-based token to a uniform resource locator (URL) configured for a webhook available on plug-in server 130. The URL provides an additional level of security as a trusted location that a potential attacker does not have access to.

At step 510, the service user of plug-in server 130 retrieves the claims-based token. In the embodiment disclosed herein, the service user of plug-in server 130 cannot directly use the retrieved claims-based token to authenticate with resource provider service 152 because the retrieved claims-based token has been delegated to the service user of host system server 120, not to the service user of plug-in server 130. Accordingly, at step 512, the service user of plug-in server 130 requests a claims-based token from authentication server 140 that is delegated to the service user of plug-in server 130. The service user of plug-in server 130 includes the retrieved claims-based token along with this request.

At step 514, authentication server 140 validates the request for the claims-based token. For example, before method 500, the service user of plug-in server 130 may use its own internal credentials to request a token from authentication server 140 that the service user of plug-in server 130 signs and includes in the request of step 512.

At step 516, authentication server 140 creates a claims-based token with authentication server 140's signature for the interactive user, which is delegated to the service user of plug-in server 130. For example, this new claims-based token may be delegated as follows: interactive user to service user of host system server 120 to service user of plug-in server 130. At step 518, authentication server 140 returns the new claims-based token to the service user of plug-in server 130, which the service user of plug-in server 130 may use to make API calls directly to resource provider service 152 on behalf of the interactive user, as discussed below in conjunction with FIG. 6.

At step 520, the service user of plug-in server 130 responds positively to the webhook request of step 508. At step 522, the service user of host system server 120 responds positively to the request for a claims-based token of step 504. Such responses typically accompany hypertext transfer protocol (HTTP) requests. After step 522, method 500 ends.

Figure 6:
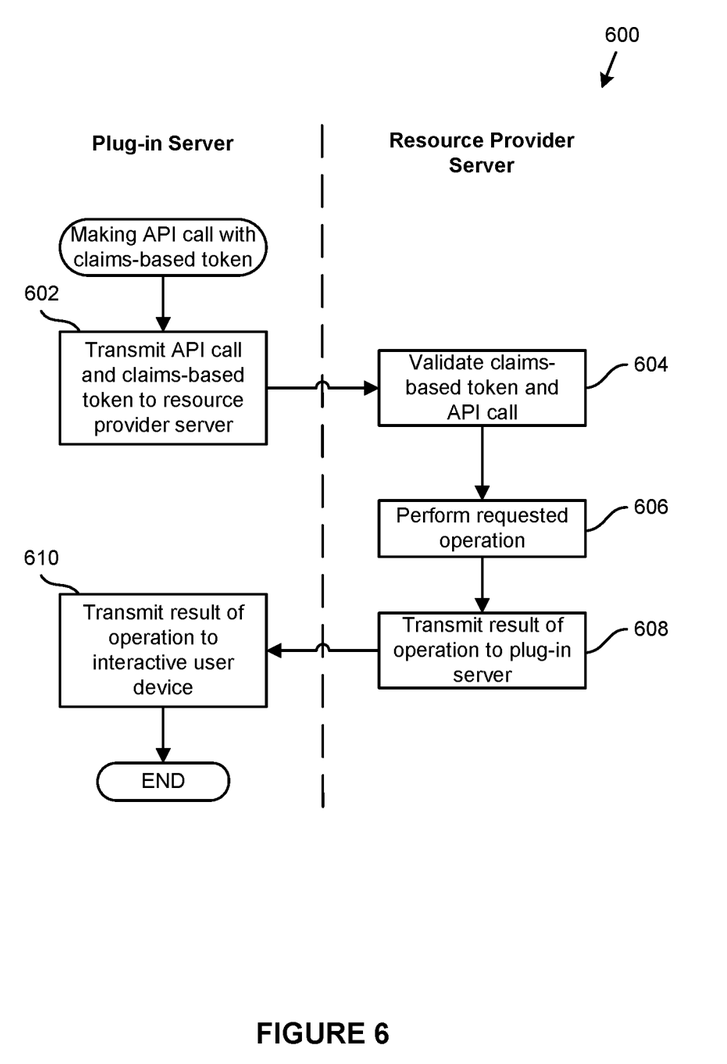
FIG. 6 is a flow diagram of steps carried out by a plug-in server and resource provider server to perform a method of making an API call to a resource provider service using a claims-based token, according to an embodiment.

FIG. 6 is a flow diagram of steps carried out by plug-in server 130 and resource provider server 150 to perform a method 600 of making an API call to resource provider service 152 using a claims-based token, according to an embodiment.

At step 602, plug-in server 130 transmits an API call to resource provider server 150, including a claims-based token delegated to the service user of plug-in server 130. The API call is signed by the service user of plug-in server 130 to prove rightful ownership of the claims-based token.

At step 604, resource provider service 152 validates the request by checking both that the service user of plug-in server 130 is the rightful owner of the claims-based token and that the claims-based token is signed by authentication server 140. At step 606, resource provider service 152 performs an operation requested by the API call. At step 608, resource provider server 150 transmits a result of performing the operation to plug-in server 130. At step 610, plug-in server 130 transmits the result to interactive user device 110 for display through plug-in UI 116. After step 610, method 600 ends.

Method 600 may be performed with the same claims-based token until the claims-based token expires. With only an infrequent request by plug-in server 130 for a new exchange of a session token for a claims-based token, plug-in server 130 may make several API calls directly to resource provider service 152 in between exchanges. Performance is thus enhanced over systems that require each API call to pass through an API gateway for a token exchange.

Figure 7:
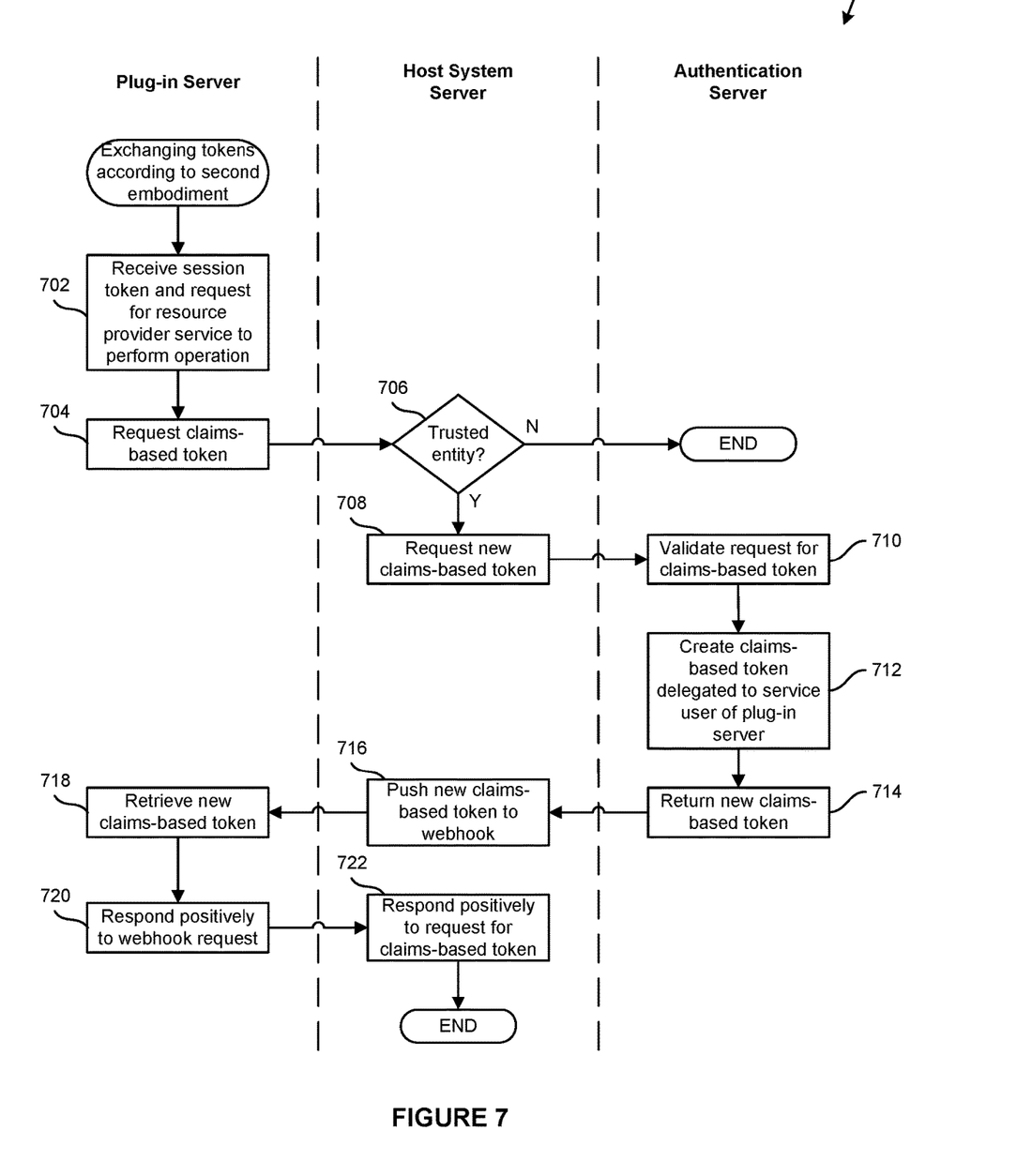
FIG. 7 is a flow diagram of steps carried out by a plug-in server, host system server, and authentication server to perform a method of securely exchanging a session token for a claims-based token, according to a second embodiment.

FIG. 7 is a flow diagram of steps carried out by plug-in server 130, host system server 120, and authentication server 140 to perform a method 700 of securely exchanging a session token for a claims-based token, according to a second embodiment. In the second embodiment, host system server 120 obtains a claims-based token for the interactive user, delegated to the service user of plug-in server 130.

At step 702, plug-in server 130 receives a session token from interactive user device 110 along with a request for resource provider service 152 to perform an operation. At step 704, plug-in server 130 transmits a request to host system server 120 for a claims-based token corresponding to the session token. Plug-in server 130 includes the session token along with the request, and the service user of plug-in server 130 signs the request.

At step 706, the service user of host system server 120 determines whether the request was transmitted by a trusted entity, e.g., using a public key of plug-in server 130. If the request was not transmitted by a trusted entity, method 700 ends.

If the request was transmitted by a trusted entity, then at step 708, the service user of host system server 120 requests a claims-based token from authentication server 140 that is delegated to the service user of plug-in server 130. The service user of host system server 120 includes with this request a claims-based token from session storage 122 corresponding to the session token and that is delegated to the service user of host system server 120. At step 710, authentication server 140 validates the request for the claims-based token, e.g., by checking the request for the service user of host system server 120's signature.

At step 712, authentication server 140 creates a claims-based token with authentication server 140's signature for the interactive user, which is delegated to the service user of plug-in server 130. For example, this new claims-based token may be delegated as follows: interactive user to service user of host system server 120 to service user of plug-in server 130. At step 714, authentication server 140 returns the new claims-based token to the service user of host system server 120.

At step 716, as a request, the service user of host system server 120 pushes the new claims-based token to a URL configured for a webhook available on plug-in server 130. At step 718, the service user of plug-in server 130 retrieves the new claims-based token, which the service user of plug-in server 130 may use to make API calls to resource provider service 152 on behalf of the interactive user, as discussed above in conjunction with FIG. 6.

At step 720, the service user of plug-in server 130 responds positively to the webhook request of step 716. At step 722, the service user of host system server 120 responds positively to the request for the claims-based token of step 704. After step 722, method 700 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are hard disk drives (HDDs), solid-state drives (SSDs), network-attached storage (NAS) systems, read-only memory (ROM), random-access memory (RAM), compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of securely exchanging a session token for a claims-based token by a plug-in integrated into an extensible computer system to enable the plug-in to authenticate with a resource provider service that performs operations for an interactive user of the extensible computer system, the method comprising:
    transmitting, to a host system server of the extensible computer system, the session token and a request for a first claims-based token that corresponds to the session token;
    acquiring, from the host system server, the first claims-based token, wherein the first claims-based token is cryptographically signed by an authentication server, and wherein the first claims-based token is delegated by the authentication server to a service user of the host system server, the service user of the host system server operating on behalf of the interactive user;
    transmitting, to the authentication server, the first claims-based token and a request for a second claims-based token; and
    receiving, from the authentication server, the second claims-based token, wherein the second claims-based token is cryptographically signed by the authentication server, wherein the second claims-based token is delegated by the authentication server to a service user of the plug-in, the service user of the plug-in operating on behalf of the interactive user, and wherein the cryptographic signing of the second claims-based token and the delegation of the second claims-based token to the plug-in enable the plug-in to use the second claims-based token to authenticate with the resource provider service to make an application programming interface (API) call requesting the resource provider service to perform a requested operation on behalf of the interactive user.

2. The method of claim 1, further comprising cryptographically signing the request for the first claims-based token.

3. The method of claim 1, wherein acquiring the first claims-based token comprises retrieving the first claims-based token from a uniform resource locator (URL) configured for a webhook.

4. The method of claim 1, further comprising receiving the session token from a device of the interactive user.

5. The method of claim 4, further comprising:
    receiving, from the device, a request to perform the operation;
    transmitting, to the resource provider service, the API call, including the second claims-based token, to perform the operation; and
    receiving, from the resource provider service, a result of performing the operation.

6. The method of claim 5, further comprising cryptographically signing the API call before transmitting the API call to the resource provider service.

7. A non-transitory computer readable medium comprising instructions that are executable in an extensible computer system, wherein the instructions when executed cause the extensible computer system to carry out a method of securely exchanging a session token for a claims-based token by a plug-in integrated into the extensible computer system to enable the plug-in to authenticate with a resource provider service that performs operations on behalf of an interactive user of the extensible computer system, said method comprising:
    transmitting, to a host system server of the extensible computer system, the session token and a request for a first claims-based token that corresponds to the session token;
    acquiring, from the host system server, the first claims-based token, wherein the first claims-based token is cryptographically signed by an authentication server, and wherein the first claims-based token is delegated by the authentication server to a service user of the host system server, the service user of the host system server operating on behalf of the interactive user;
    transmitting, to the authentication server, the first claims-based token and a request for a second claims-based token; and
    receiving, from the authentication server, the second claims-based token, wherein the second claims-based token is cryptographically signed by the authentication server, wherein the second claims-based token is delegated by the authentication server to a service user of the plug-in, the service user of the plug-in operating on behalf of the interactive user, and wherein the cryptographic signing of the second claims-based token and the delegation of the second claims-based token to the plug-in enable the plug-in to use the second claims-based token to authenticate with the resource provider service to make an application programming interface (API) call requesting the resource provider service to perform a requested operation on behalf of the interactive user.

8. The non-transitory computer readable medium of claim 7, the method further comprising cryptographically signing the request for the first claims-based token.

9. The non-transitory computer readable medium of claim 7, wherein acquiring the first claims-based token comprises retrieving the first claims-based token from a uniform resource locator (URL) configured for a webhook.

10. The non-transitory computer readable medium of claim 8, the method further comprising receiving the session token from a device of the interactive user.

11. The non-transitory computer readable medium of claim 10, the method further comprising:
    receiving, from the device, a request to perform the operation;
    transmitting, to the resource provider service, the API call, including the second claims-based token, to perform the operation; and
    receiving, from the resource provider service, a result of performing the operation.

12. The non-transitory computer readable medium of claim 11, the method further comprising cryptographically signing the API call before transmitting the API call to the resource provider service.

13. An extensible computer system comprising:
    an authentication server;
    a host system server; and
    a plug-in server hosting a plug-in that is integrated into the extensible computer system and that is to authenticate with a resource provider service that performs operations for an interactive user of the extensible computer system, wherein the plug-in server runs on a hardware platform that includes a processor and memory, and the processor is configured to execute instructions from the memory to:

transmit, to the host system server, a session token and a request for a first claims-based token that corresponds to the session token;

acquire, from the host system server, the first claims-based token, wherein the first claims-based token is cryptographically signed by the authentication server, and wherein the first claims-based token is delegated by the authentication server to a service user of the host system server, the service user of the host system server operating on behalf of the interactive user;

transmit, to the authentication server, the first claims-based token and a request for a second claims-based token; and receive, from the authentication server, the second claims-based token, wherein the second claims-based token is cryptographically signed by the authentication server, wherein the second claims-based token is delegated by the authentication server to a service user of the plug-in, the service user of the plug-in operating on behalf of the interactive user, and wherein the cryptographic signing of the second claims-based token and the delegation of the second claims-based token to the plug-in enable the plug-in to use the second claims-based token to authenticate with the resource provider service to make an application programming interface (API) call requesting the resource provider service to perform a requested operation on behalf of the interactive user.

14. The extensible computer system of claim 13, wherein the plug-in server is further configured to cryptographically sign the request for the first claims-based token.

15. The extensible computer system of claim 13, wherein acquiring the first claims-based token comprises retrieving the first claims-based token from a uniform resource locator (URL) configured for a webhook.

16. The extensible computer system of claim 13, wherein the plug-in server receives the session token from a device of the interactive user.

17. The extensible computer system of claim 16,
wherein the plug-in server receives, from the device, a request to perform the operation, and
wherein the plug-in server is further configured to:
transmit, to the resource provider service, the API call, including the second claims-based token, to perform the operation, and
receive, from the resource provider service, a result of performing the operation.

\* \* \* \* \*